United States Patent
Tanaka

[11] Patent Number: 6,002,557
[45] Date of Patent: *Dec. 14, 1999

[54] DISC CARTRIDGE WITH OPENING DETECTOR

[75] Inventor: Satoshi Tanaka, Yokohama, Japan

[73] Assignee: Kabushiki Kaisha Toshiba, Kawasaki, Japan

[ * ] Notice: This patent is subject to a terminal disclaimer.

[21] Appl. No.: 09/058,412

[22] Filed: Apr. 10, 1998

Related U.S. Application Data

[63] Continuation of application No. 08/730,293, Oct. 11, 1996, Pat. No. 5,796,713.

[30] Foreign Application Priority Data

Oct. 13, 1995 [JP] Japan .................................. 7-265861

[51] Int. Cl.$^6$ .................................................. G11B 23/03
[52] U.S. Cl. .......................................... 360/133; 369/291
[58] Field of Search ........................... 360/133; 369/289, 369/291, 292; 206/308.1, 308.2, 387.11, 807

[56] References Cited

U.S. PATENT DOCUMENTS

| | | | |
|---|---|---|---|
| 3,500,364 | 3/1970 | David et al. | 206/308.3 |
| 4,476,978 | 10/1984 | Saito | 206/444 |
| 4,618,061 | 10/1986 | Rubenfeld | 206/444 |
| 4,737,876 | 4/1988 | Brock et al. | 360/133 |
| 4,805,061 | 2/1989 | Champagne et al. | 360/133 |
| 4,837,652 | 6/1989 | Kerby | 360/133 |
| 4,843,511 | 6/1989 | Downey | 360/133 |
| 5,041,923 | 8/1991 | Iwata et al. | 360/60 |
| 5,150,269 | 9/1992 | Iwaki et al. | 360/133 |
| 5,150,354 | 9/1992 | Iwata et al. | 369/291 |
| 5,293,293 | 3/1994 | Iwata et al. | 360/133 |
| 5,314,552 | 5/1994 | Sager | 156/73.3 |
| 5,325,256 | 6/1994 | Miyazaki et al. | 360/132 |
| 5,417,324 | 5/1995 | Joyce et al. | 206/310 |
| 5,421,950 | 6/1995 | Parrish | 156/579 |
| 5,499,233 | 3/1996 | Childers et al. | 369/291 |
| 5,526,342 | 6/1996 | Akiyama et al. | 369/291 |
| 5,539,600 | 7/1996 | Lee et al. | 360/133 |
| 5,796,713 | 8/1998 | Tanaka | 360/133 |

*Primary Examiner*—Brian E. Miller
*Attorney, Agent, or Firm*—Pillsbury Madison & Sutro LLP

[57] ABSTRACT

A cartridge body of a disc cartridge stores an optical disc kept rotatable, and includes a disc inlet/outlet port for taking in and out the optical disc. A lid member is mounted on the cartridge body to be movable between a closed position wherein the lid member closes the disc inlet/outlet port and an opened position wherein the lid member opens the disc inlet/outlet port. The lid member has a through hole extending in a direction perpendicular to the moving direction of the lid member. A detect pin projecting from the cartridge body and is inserted into the through hole of the lid member in the closed position. The detect pin is removable from the cartridge body by opening movement of the lid member so as to indicate that the lid member has been opened.

3 Claims, 11 Drawing Sheets

DISC CARTRIDGE WITH OPENING DETECTOR

This application is a continuation of Ser. No. 08/730,293 filed Oct. 11, 1996, now U.S. Pat. No. 5,796,713.

BACKGROUND OF THE INVENTION

1. Field of the Invention

The present invention relates to a disc cartridge that contains a disc-like recording medium, such as an optical disc, magneto-optical disc, a magnetic disc or the like, and which has an opening for providing access to the recording medium for recording and/or reproducing an information signal.

2. Description of the Related Art

Conventionally, a disc cartridge comprises a flat rectangular cartridge body consisting of an upper case and a lower case coupled with each other, and a disc, such as an optical disc, magneto-optical disc, or an magnetic disc, rotatably contained in the cartridge body. Each of the upper and lower cases has an opening for exposing that region of the disc which extends from the center portion of the disc to the outer peripheral portion thereof. A pick-up and a turn-table for rotating the disc of a recording reproduction device access the disc through the opening portions. In addition, the cartridge body is equipped with a slidable shutter for closing and opening the opening sections. The shutter is made of a thin metal plate or hard synthetic resin.

On each of the outer surfaces of the cases is formed a concave label adhering portion such that the concave portion is recessed from the other portions of the surface, and an indication label for indicating the contents of the disc is adhered to each of the label adhering portions.

When a disc cartridge having the above-mentioned structure is loaded into a disc recording reproduction device, the shutter is slid at first to an end of the cartridge body by a shutter open/close mechanism, thereby opening the opening portions. Subsequently, a turn-table is inserted into the cartridge body through one of the opening portions to support the disc, and a pick-up faces the surface of the disc through the opening portion. In this state, the disc is rotated by the turn-table, and recording and/or reproduction is performed by the pick-up.

In this kind of disc cartridge, the disc is contained in the cartridge body and the opening portions are closed by the shutter when the disc cartridge is not used, thus realizing safe disc storage. In addition, because the shutter is slid so that the disc in the cartridge body is exposed through the opening portions to enable recording and reproduction, permanent use of the disc is realized.

In the disc cartridge having the structure described above, however, while the disc protection ensures that the disc, will last the disc cannot be taken out of the cartridge body so that it is difficult to directly load the disc itself in the disc recording/reproducing device, for example. This kind of disc cartridge thus receives severe limitations in the degree of freedom in disc use.

Particularly, in recent years, there have been requests for a disc cartridge applicable to both a disc recording/reproducing device which is used with one disc singly loaded thereto, and a disc recording/reproducing device which is used with the entire disc cartridge loaded thereto.

SUMMARY OF THE INVENTION

The present invention has been made in view of the above situation, and has its object to provide a disc cartridge which enables identification of use of a recording medium while realizing two-mode use of a recording medium, i.e., use of a disc cartridge storing a recording medium and single use of a recording medium.

In order to achieve the above object, the disc cartridge according to the present invention comprises: a cartridge body rotatable storing, a disc-like recording medium, the cartridge body including an opening portion for exposing a part of a surface of the recording medium, and a disc inlet/outlet port for removing the recording medium from the cartridge body; a shutter slidably arranged on the cartridge body for opening/closing the opening portion; a lid member mounted on the cartridge body movable between a closed position wherein the lid member closes the disc inlet/outlet port and an opened position wherein the lid member opens the disc inlet/outlet port; and an opening detector for detecting a state in which the lid member has been moved and opened the disc inlet/outlet port.

According to the above-described disc cartridge, when the lid member is opened, the opening detector detects the opening movement and indicates that the lid member has been opened. As a result, the the recording medium contained in the cartridge body can be taken out, and whether or not the recording medium contained in the cartridge body has been subjected to a single use is identified.

In addition, the disc cartridge according to the present invention comprises: a cartridge body for rotatably storing a disc-like recording medium, the cartridge body including an opening portion for exposing a part of a surface of the recording medium, and a disc inlet/outlet port for selectively removes and/or replacing the recording medium; a shutter slidably arranged on the cartridge body, for opening/closing the opening portion; a lid member mounted on the cartridge body so to be movable between a closed position wherein the lid member closes the disc inlet/outlet port and an opened position wherein the lid member opens the disc inlet/outlet port; a write protect operating portion for controlling recording of information onto the recording medium, the write protect operating portion provided such that the write protect operating portion can be operated from outside the cartridge body when the lid member is in the closed position; and an opening detector provided at the cartridge body and the write protect operating portion for detecting a state in which the lid member has been opened.

According to the above structure, when the lid member is opened, the write protect operating portion is moved from the position on the surface of the cartridge body facing the recording medium in accordance with the opening movement of the lid member. The opening detector then detects the write protect operating portion thus moved, and indicates that the lid member is opened with respect to the disc inlet/outlet port. In this manner, confirmation is made that as the recording medium contained in the cartridge body can be taken out, and identifying whether or not the recording medium contained in the cartridge body has been singly used.

Further, according to the present invention, the lid member for closing the disc inlet/outlet port has a color that is different from that of the cartridge body. As a result, when the recording medium is in the cartridge structure, the direction in which the cartridge body is loaded can be confirmed on the bases of the lid member, so that an incorrect insertion of the cartridge into a disc recording/reproducing device can be effectively prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will now be described in detail with reference to the accompanying drawings.

Figure 1:
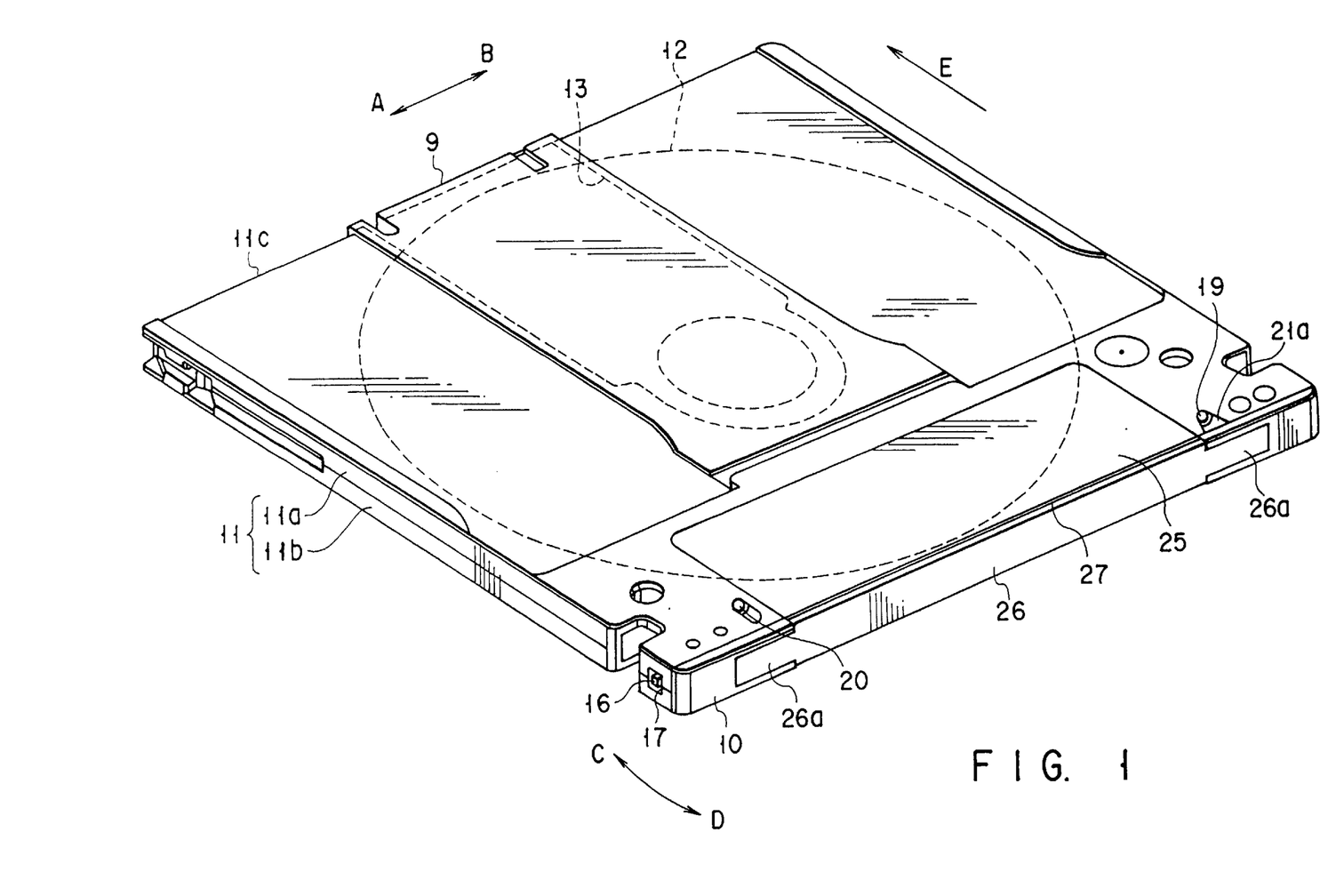
FIG. 1 is a perspective view showing a disc cartridge according to an embodiment of the present invention.
Figure 2:
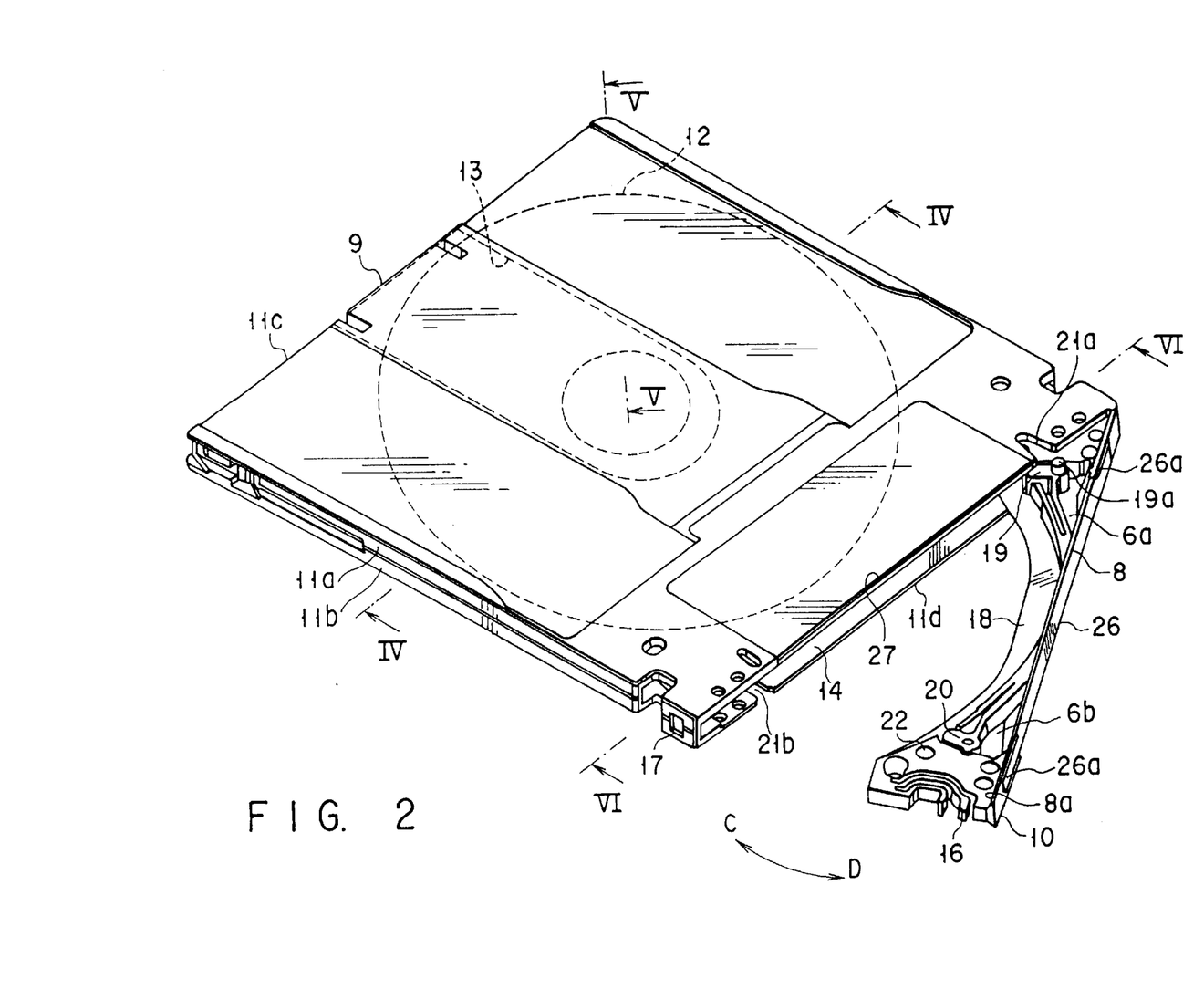
FIG. 2 is a perspective view of the above-mentioned disc cartridge where its lid member is opened.

As shown in FIGS. 1 and 2, a disc cartridge according to the present embodiment, comprises a flat rectangular box-like cartridge body 11 and an optical disc 12 contained rotatably in the cartridge body. The cartridge body includes a pair of main walls (or main surfaces) which face each other and are in parallel with each other, and four side walls (or side surfaces) which are positioned continuously along the peripheral edges of the main walls.

The cartridge body 11 includes an upper casing 11a and a lower casing 11b which are substantially symmetrical to each other and made of synthetic resin such as ABS or the like. These casings are arranged so as to face each other, constituting the cartridge body. Further, a disc storing portion 15 which will be described later is defined within the cartridge body 11, and the optical disc is stored in the disc storing portion 15 (FIGS. 4–6) with a predetermined clearance maintained between the disc surfaces and the inner surfaces of the cartridge body 11. The upper and lower casings 11a and 11b respectively face the surfaces A and B of the optical disc 12.

In addition, an opening 13 is formed in each of the upper and lower casings 11a and 11b. The openings 13 have a predetermined width, extend to the vicinity of the front surface 11c of the cartridge body 11 from the center portions of the casings, and face each other. These openings 13 respectively face the surfaces A and B of the optical disc 12 contained in the cartridge body 11, exposing the optical disc to the outside over the region from the rotational center of the disc to the outer periphery thereof.

The cartridge body 11 is provided with a shutter 9 of a double-side integral type which opens/closes both of the openings 13. The shutter 9 has a substantially U-shaped cross-section and is fitted onto the cartridge body 11 from the front surface 11c side so as to sandwich both surfaces of the cartridge body. As shown in FIGS. 1 and 2, the shutter 9 is slidable between a closed position wherein the shutter closes the openings 13 and two open positions defined in both sides of the closed position wherein the shutter opens the openings 13, in a direction (or direction A-B) parallel to the front end surface 11c of the cartridge body 11. Further, the shutter 9 is continuously urged toward the closed position by shutter springs not shown.

A disc inlet/outlet port 14 for inserting/extracting the optical disc 12 into/from the cartridge body 11 is formed in the rear surface 11d of the cartridge body 11, the port 14 extending over the entire length of the rear surface 11. In addition, a lid member 10 for opening/closing the inlet/outlet port 14 is rotatably mounted on the cartridge body 11.

Here, supposing that the insert direction in which the disc cartridge is loaded into a disc record/reproduce device is E, the end surface of the disc cartridge body 11 positioned in the forward side in the insert direction is defined as the front surface 11c, while the end surface of the disc cartridge body positioned in the backward side in the insert direction is defined as the rear surface 11d.

Figure 3:
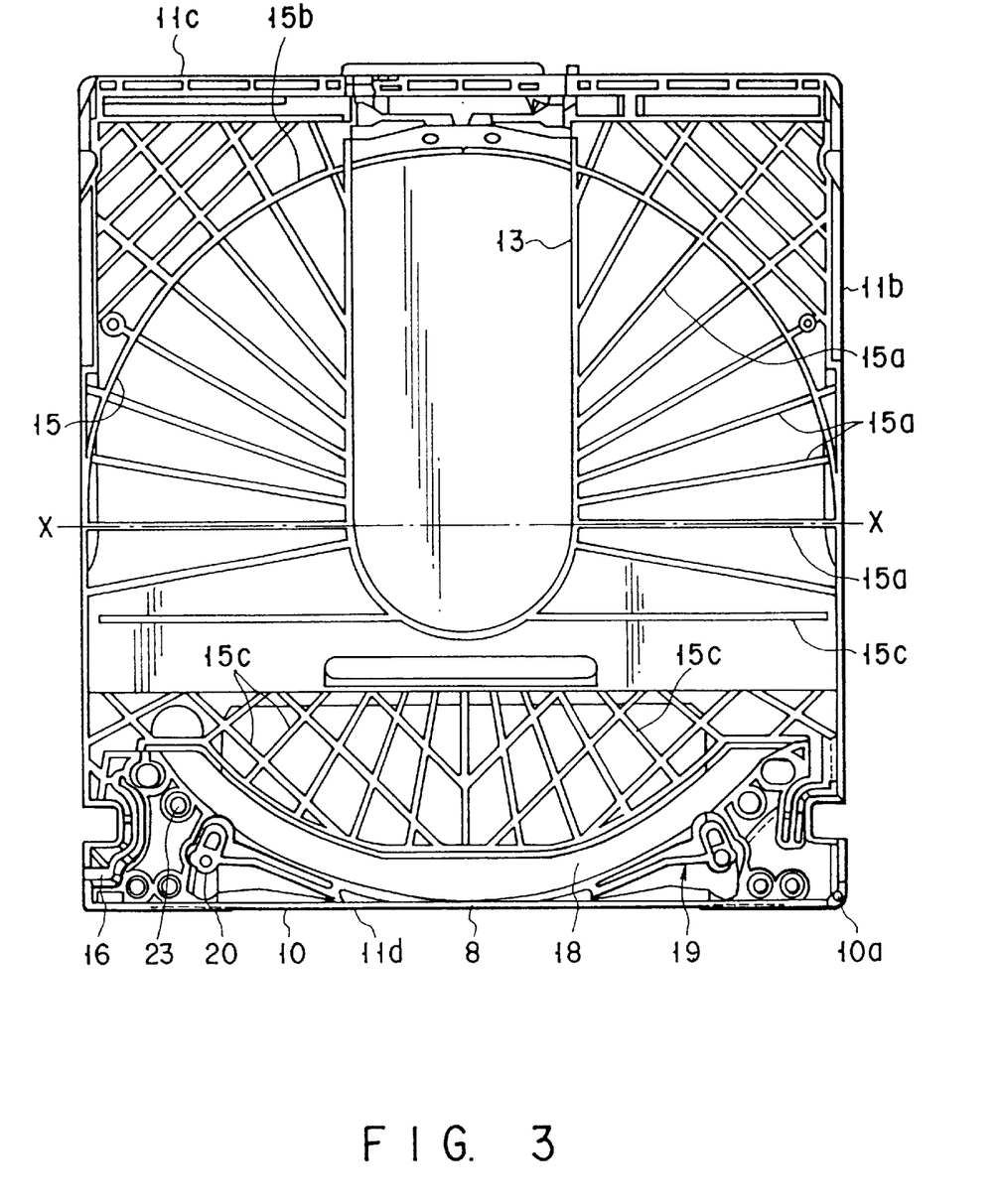
FIG. 3 is a plan view showing the lower case and the lid member of the disc cartridge.
Figure 4:
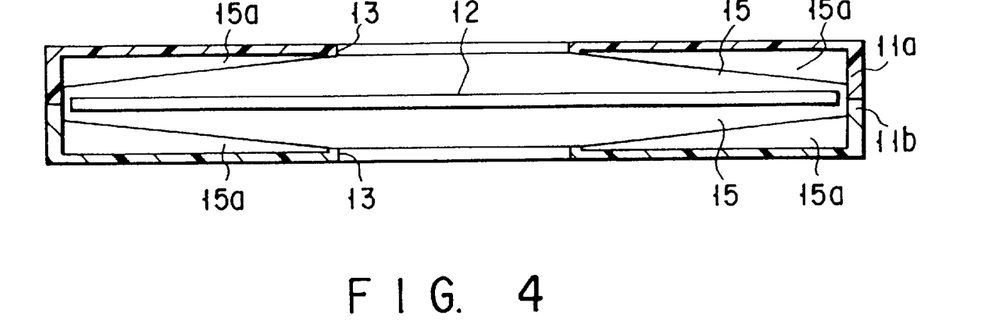
FIG. 4 is a cross-section cut along the line IV—IV of FIG. 2.
Figure 5:
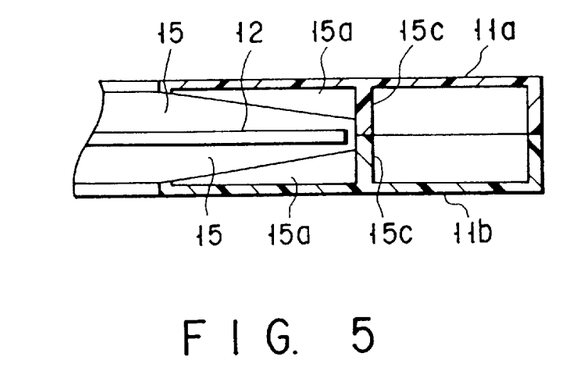
FIG. 5 is a cross-section cut along the line V—V of FIG. 2.

As shown in FIGS. 3 to 5, on the inner surface of the lower casing 11b, a number of ribs 15a extending in the radial direction from the center of the lower casing corresponding to the center of the stored optical disc 12 and a rib 15b having an half-circle shape around the center of the lower casing as its center are provided in the region (or second region) between the center line X—X of the lower casing and the front surface 11c. These ribs 15a are arranged at predetermined intervals in the circumferential direction around the center of the lower casing 11b. Each of the ribs 15a is shaped such that the height is increased gradually in the radial direction from the center of the lower casing 11b. The semi-circular rib 15b has a diameter slightly larger than that of the optical disc 12.

Figure 6:
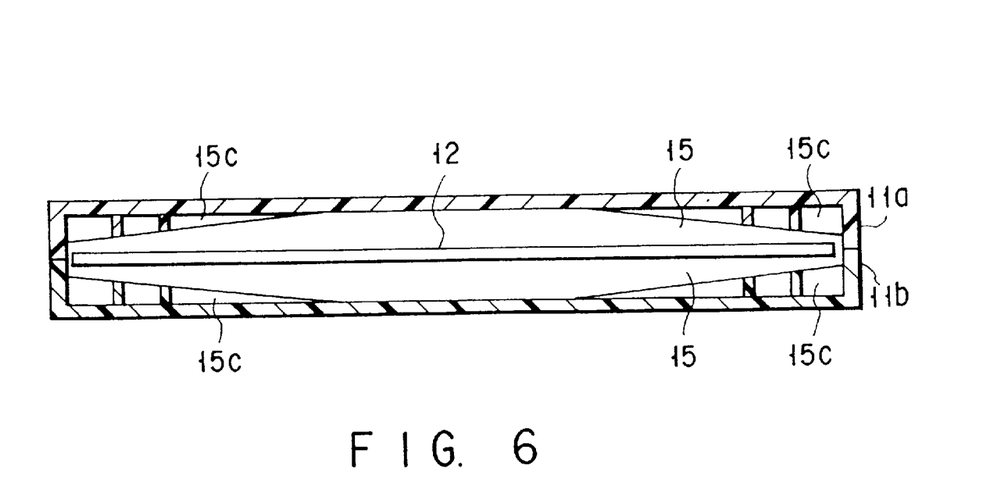
FIG. 6 is a cross-section cut along the line VI—VI of FIG. 2.

Meanwhile, as shown in FIGS. 3 and 6, on the inner surface of the lower casing 11b, a number of ribs 15c are formed within a region (or first region) between the center line X—X of the lower casing and the rear surface 11d. These ribs 15c are formed such that the ribs are small in area of the center portion of the lower casing 11b and are large in the area of both end portions thereof, viewed in the widthwise direction of the lower casing 11b, i,e,. in a direction parallel to the center line X—X.

Note that the upper casing 11a comprises ribs 15a, 15b, and 15c similar to those described above, and is formed in the same manner as the lower casing 11b. Therefore, the disc storing portion 15 of the cartridge body 11, which is defined between the upper and lower casings, is shaped such that this portion 15 is broad in the area of the center portion of the optical disc 12 and becomes narrower toward the outer circumference of the disc 12, as far as the front end half region (or the second region) of the cartridge body 11. With respect to the rear end half region (or the first region) of the cartridge body 11, the disc storing portion 15 has the smallest thickness dimension at both side end portions of the cartridge body and has the largest thickness dimension at the center portion between both side portions of the cartridge body. As a result of this, the optical disc 12 is contained in the disc storing portion 15, with only the outer peripheral portion supported, and only the outer peripheral portion contacts the inner surface of the cartridge body 11 when the optical disc 12 passes through the disc inlet/outlet port 14.

Although the upper and lower casings 11a and 11b of the cartridge body 11 define the disc storing portion 15 and the disc inlet/outlet port 14 by means of a plurality of ribs 15a, 15b, and 15c, the same shapes as the storing portion 15 and the port 14 may be defined by the inner surfaces themselves of the casings without using ribs.

Figure 7:
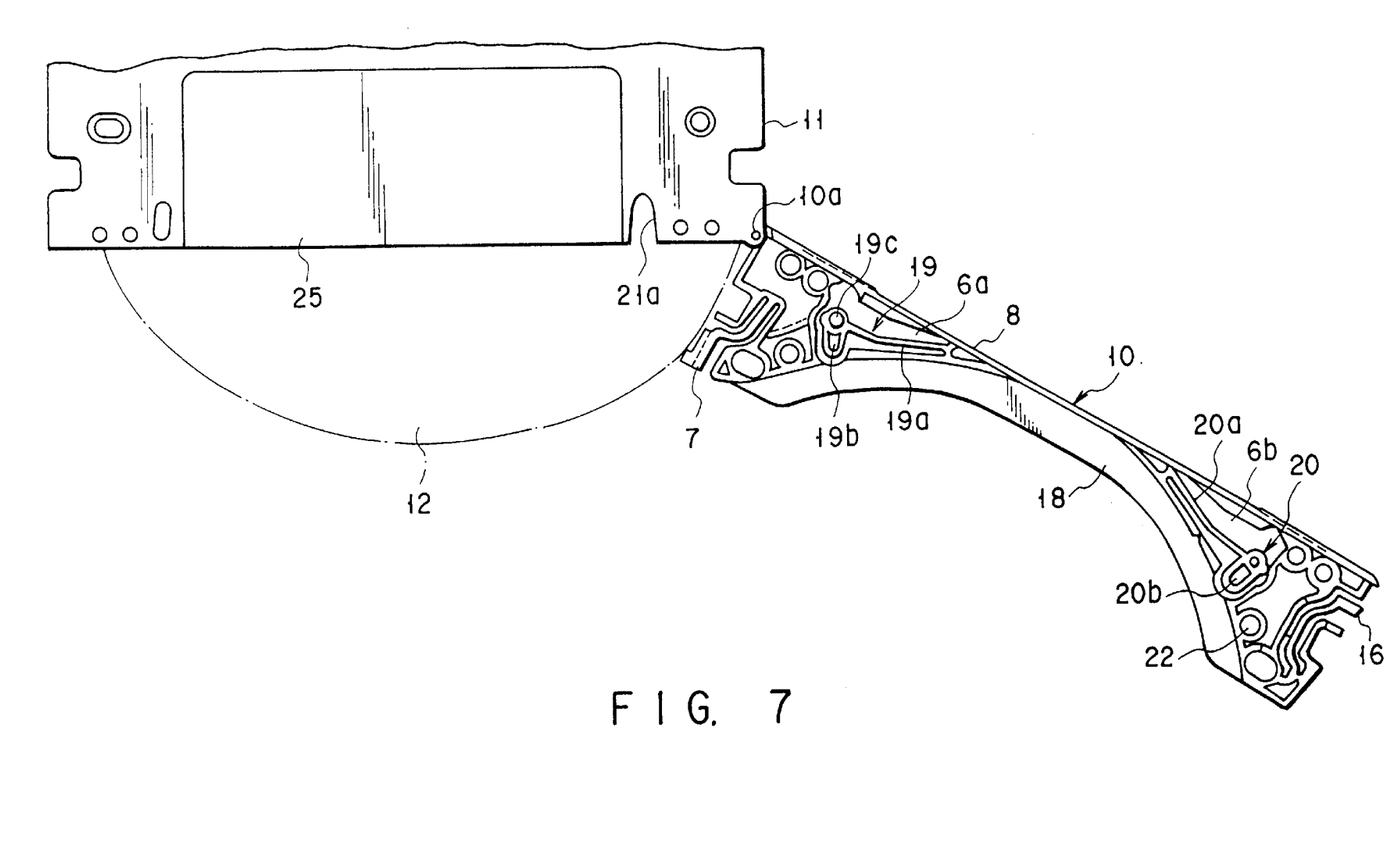
FIG. 7 is a plan view showing the lid member released.

As shown in FIGS. 2, 3, and 7, the lid member 10 is shaped like a flat elongated plate, has a length substantially equal to the width of the cartridge body 11 and has a thickness which allows the lid member to be fitted into the disc storing portion 15. A fringe 8 is formed at one side of the lid member 10 and extends over the entire width of the cartridge body. This fringe 8 projects upwards and downwards from the lid member 10 in the thickness direction of the cartridge body 11. The lid member 10 is integrally formed of synthetic resin, and is especially formed of synthetic resin of a color different from that of the cartridge body 11.

One end of the lid member 10 is pivoted on a rear right corner portion of the cartridge body 11 by a pivot shaft 10a. Therefore, the lid member 10 can be rotated in the arrow direction C-D around the pivot shaft 10a, thereby opening/closing the disc inlet/outlet port 14. When the lid member 10 is rotated to a closed position, the lid member 10 enters into the disc storing portion 15 through the disc inlet/outlet port 14, and the fringe 8 abuts against the rear end edges of the cartridge body 11, thereby closing the disc inlet/outlet port 14.

A free end portion of the lid member 10, i.e., the end portion of the lid member 10, which is opposite the pivot shaft 10a, is provided with a lock claw 16, which is elastically deformable, while an engage hole 17 which engages the lock claw 16 is formed in the rear end portion of the left side wall of the cartridge body 11. Therefore, when the lid member 10 is rotated to the position where the lid member 10 closes the disc inlet/outlet port 14, the lock claw 16 engages the engage hole 17, thereby locking the lid member 10 to the close position. Note that this locking can be released and the lid member 10 can be opened, by pushing the lock claw 16 inward through the engage hole 17 from the outside of the cartridge body 11.

Figures 8, 9, 10:
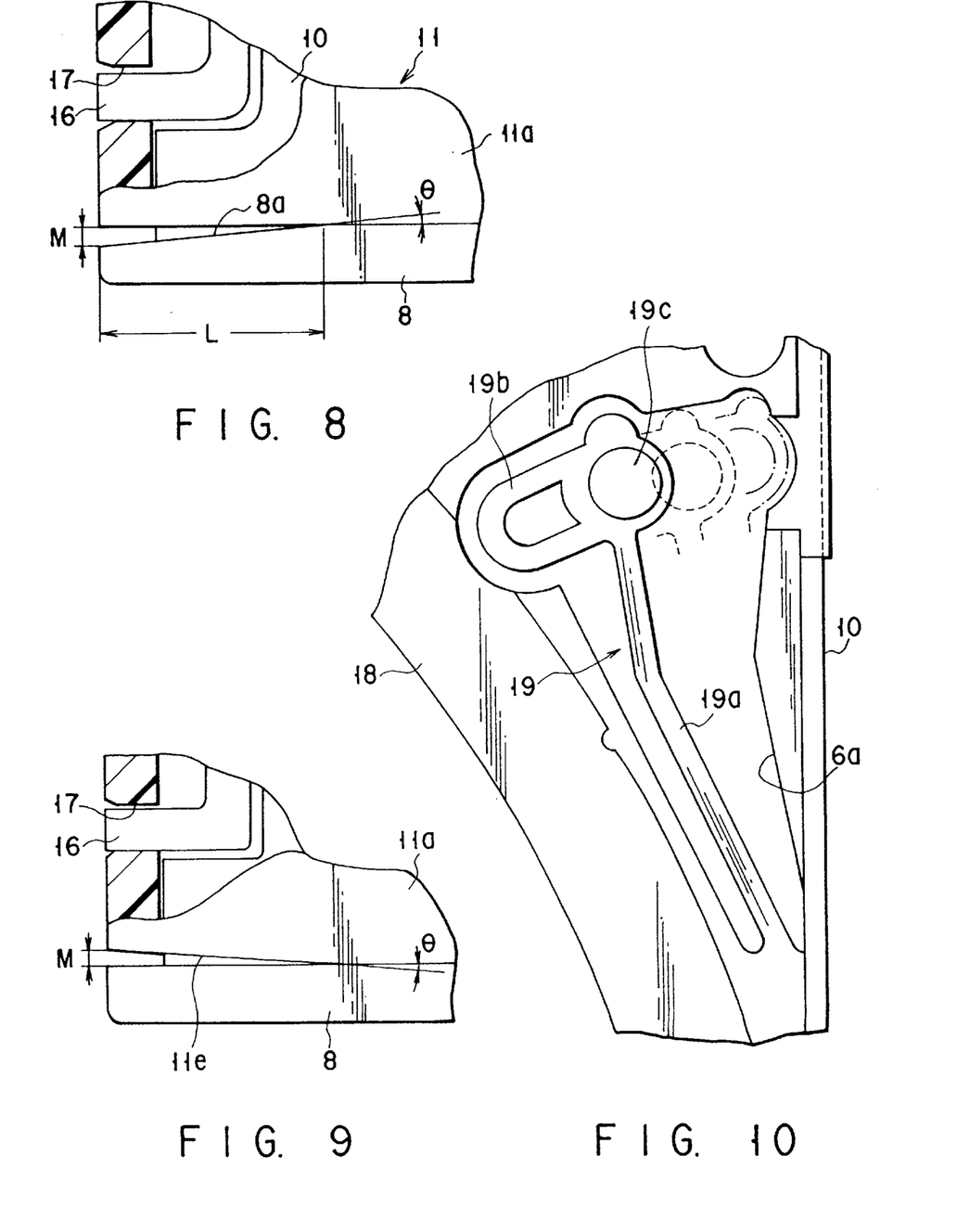
FIG. 8 is an enlarged plan view showing a free end of the lid member.
FIG. 9 is a plan view showing a modification of the lid member and the cartridge body.
FIG. 10 is an enlarged plan view showing the write-protect portion of the lid member.

As shown in FIG. 8, at the free end portion of the lid member 10, slanting surfaces 8a are formed on the fringe 8 such that a clearance M is formed between the fringe 8 and the rear edges of the upper and lower casings 11a and 11b when the lid member 10 is closed. Each of the slanting surfaces 8a extends outwards in the direction of a 10° angle from the point positioned apart from the free end of the fringe 8 by a length L. Thus, a clearance M of about 0.3 mm is obtained at the free end of the lid member 10.

In the above structure, the lock claw 16 of the lid member 10 and the engage hole 17 of the cartridge body 11 can be engaged with each other with a minimum margin, and thereby preventing backlash of the lid member 10 in the close position. Specifically, the lock claw 16 is positioned and formed in a manner such that the free end portion of the lid member 10 is further pushed toward the rear surface 11d side by the clearance M and is thus elastically deformed so that the lock claw 16 is engaged with the engage hole 17, after the lid member 10 is rotated to the close position to bring the other portion of the fringe 8 than the slanting surface 8a, into contact with the rear end surface 11d of the cartridge body. Therefore, when the pushing force applied to the free end portion of the lid member 10 is released after the lock claw 16 is engaged with the engage hole 17, the free end portion of the lid member 10 generates an elastic force in the direction in which this free end portion is apart from the rear surface 11d of the cartridge body 11, and the lock claw 16 is kept engaged with the engage hole 17 by this elastic force. Therefore, the lid member 10 securely closes the disc inlet/outlet port 14 of the cartridge body 11 without backlashing.

The same function described above can be obtained if slanting surfaces 11e are formed on the rear end surface 11d of the cartridge body 11, as shown in FIG. 9, in place of forming slanting surfaces 8a on the fringe 8 of the lid member 10.

As shown in FIGS. 2, 3, and 7, the lid member 10 is provided with an arc-like disc guide recess 18 in correspondence with the disc storing portion 15 of the cartridge body 11. When the lid member 10 is closed, a part of the optical disc 12 is positioned in the disc guide recess 18. When the optical disc 12 stored in the disc storing portion 15 is taken out of the cartridge body 11 through the disc inlet/outlet port 14 while the lid member 10 is rotated in the arrow direction D and is thereby opened, the outer peripheral portion of the optical disc 12 is partially stored in the disc guide recess 18 and is thus prevented from suddenly or directly falling from the cartridge.

In addition, a stopper 7 having a claw-like shape which can be elastically deformed is provided at the end portion of the lid member 10 in the side close to the pivot shaft 10a. This stopper 7 elastically hangs on the outer peripheral portion of the optical disc 12 and prevents the optical disc from suddenly falling, when the lid member 10 is sufficiently opened and the optical disc 12 is extracted out of the cartridge body 11.

As shown in FIGS. 2, 3, 7, and 10, first and second write protect operating portions 19 and 20, which are elastically deformable, are integrally formed on the lid member 10, so as to correspond to the surfaces A and B of the optical disc 12. For example, the first write protect operating portion 19 includes an arm portion 19a projecting from the substantial center portion of the lid member 10 in the widthwise direction thereof toward the end portion of the lid member close to the pivot shaft 10a side, a sector portion 19b provided at the extended end of the arm portion 19a, and a switch operating element 19c projecting from the sector portion 19b toward the upper casing 11a side. Further, the first write protect operating portion 19 is positioned in an opening 6a formed in the lid member 10, and only the proximal end of the arm portion 19a is connected to the lid member. As a result, the write protect operating portion 19 is thus rotatable in the opening 6a around the proximal end of the arm portion 19a as the rotational center.

The second write protect operating portion 20 is formed to be symmetrical to the first write protect operating portion 19 with respect to the center of the lid member 10 in the widthwise direction thereof. Specifically, the second write protect operating portion 20 includes an arm portion 20a, a sector portion 20b provided at the extended end of the arm portion, and a switch operating element 20c (see FIG. 11C) projecting from the sector portion toward the lower casing 11b side. Further, the second write protect operating portion 20 is positioned in an opening 6b formed in the lid member 10, and only the proximal end of the arm portion 20a is connected to the lid member.

In, in the vicinity of the pivot shaft 10a of the lid member 10, a storing hole 21a is formed in the rear end portion of the upper casing 11a and open to the rear end surface 11d. In the vicinity of the engage hole 17, another storing hole 21b is formed in the rear end portion of the lower casing 11b and open to the rear end surface 11d. Further, where the lid member 10 is closed, the switch operating element 19c of the first write protect operating portion 19 and the switch operating element 20c of the second write protect operating portion 20 are respectively stored in the storing holes 21a and 21b, and the first and second write protect operating portions 19 and 20 can be actuated through the storing holes.

Upon assembling the disc cartridge, when the lid member 10 is attached to the cartridge body 11 at the disc inlet/outlet port 14, the lid member 10 is first mounted at a predetermined position on the lower casing 11b. In this case, the pivot shaft 10a integrally formed with the lid member 10 is inserted into a hole (not shown) of the lower casing 11b, and the lid member is maintained at its closed position. Next, the upper casing 11a is covered over the lid member 10 and the lower casing 11b from the upside, such that the pivot shaft 10a of the lid member 10 is inserted into a hole (not shown) of the upper casing. In this manner, the lid member 10 is assembled between the upper and lower casings 11a and 11b and kept at the closed position.

Figure 11A:
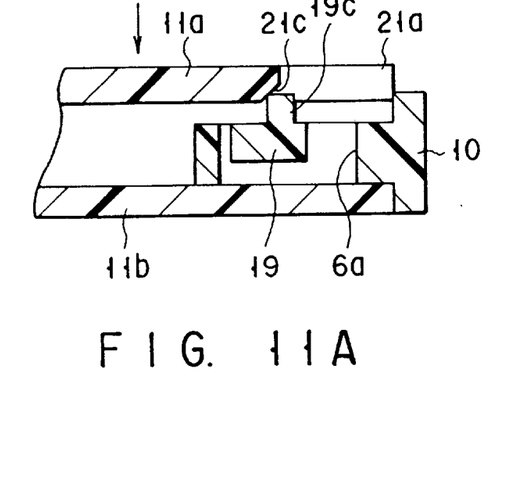
FIGS. 11A and 11B are cross-sections schematically showing a step of positioning a first write-protect operating portion.
Figure 11B:
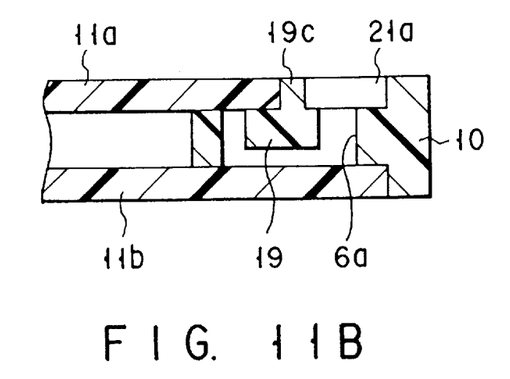
Figure 11C:
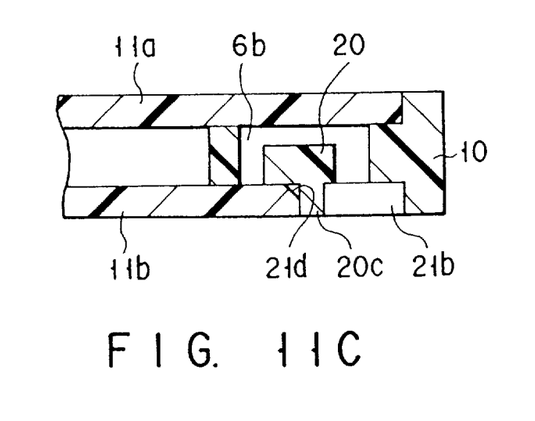
FIG. 11C is a cross-section schematically showing a step of positioning a second write-protect operating portion.
Figure 12A:
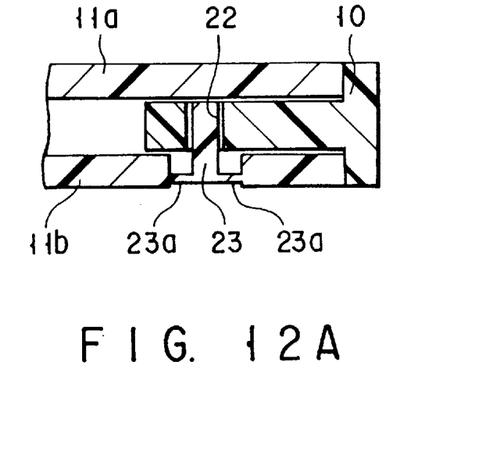
FIG. 12A is a cross-section showing an opening detect portion of the disc cartridge.
Figure 12B:
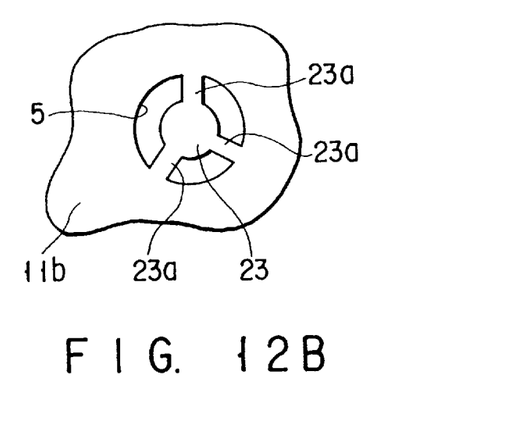
FIG. 12B is a plan view showing a detect pin portion of the opening detect portion.

Here, as shown in FIGS. 11A and 11B, the storing hole 21a formed in the upper casing 11a has a slanting surface 21c which is positioned in the bottom side of the storing hole 21a and in the inner surface side of the upper casing 11a and which functions as guide means. When the upper casing 11a is covered over the lower casing 11b, the switch operating element 19c of the first write protect operating portion 19 of the lid member 10 is guided to the rear end surface side of the upper casing 11a along the slanting surface 21c of the storing hole 21a. At the time where connection between both casings is completed (or in the state where assembling of both casings is completed), the switch operating element 19a is contained in the storing hole 21a, kept in contact with the bottom end of the storing hole 21a, and the first write protect operating portion 19 is positioned at a predetermined initial operating position.

Specifically, the first write protect operating portion 19 is in a molding position indicated by a solid line in FIG. 10 before the lid member 10 is assembled into the cartridge body 11. Further, the first write protect operating portion 19 is automatically positioned at the initial operating position indicated by a broken line in FIG. 10 when the lid member 10 is assembled in the cartridge body 11. Then, this first write protect operating portion 19 is switched between the initial operating position (e.g., a write protect position) and a switched position (or a write allowable position) indicated by a dots and dashed line shown in FIG. 10. Note that the initial operating position may otherwise be set to a write allowable position while the switched position may be set to the write protect position.

Likewise, the second write protect operating portion 20 is positioned at an initial operating position at the time point, such that the switch operating element 20c is guided along the slanting surface 21d of the storing hole 21b formed in the lower casing 11b and is brought into contact with the bottom end of the storing hole 21b, and that the operating portion 20 can be operated, when connection between the upper casing 11a and the lower casing 11b is completed.

As shown in FIGS. 1 to 3, 7, 12A, and 12B, the disc cartridge comprises an opening detect mechanism for detecting whether the lid member is opened or closed. Specifically, a through-hole 22 for detecting whether the lid member is opened or closed is formed in the vicinity of the free end of the lid member 10, and extends in the direction perpendicular to the moving direction of the lid member. In a state in which the lid member 10 is in the closed position, a detection pin 23 standing on the inner surface of the lower casing 11b is inserted in the through-hole 22.

The proximal end portion of the detect pin 23 is positioned in a circular opening 5 defined in the lower casing 11b and is formed integrally with the lower casing 11b while being connected to the lower casing 11b through thin bridges 23a, so that the pin 23 can be easily bent and taken off from the lower casing 11b. The opening 5 is aligned with the through-hole 22 of the lid member 10 when the lid member 10 in the closed position. Further the detect pin 23 is inserted into the through-hole 22 when attaching the lid member 10 to the casing so as to corresponding to the disc inlet/outlet port 14 of the lower casing 11b while assembling the disc cartridge.

Before the lid member 10 is opened for the first time after assembling the disc cartridge, the detect pin 23 is kept inserted in the through-hole 22 of the lid member 10. Therefore, the through-hole 22 is closed by the detect pin 23, and cannot be used to detect whether or not the lid member 10 has once been opened.

If the lid member 10 is rotated and opened in the arrow direction D around the pivot shaft 10a as the rotation center to extract the optical disc 12 from the cartridge body 11, the detect pin 23 is pushed by the lid member 10 and is bent at the bridges 23a and detached from the lower casing 11b, so that detect pin 23 is removed together with the lid member to the outside of the cartridge body. In addition, the circular opening 5 is formed as a mark of the detect pin 23 after this pin is taken off. Therefore, when the lid member 10 is closed again, the circular opening 5 of the lower casing 11b and the through-hole 22 of the lid member 10 are aligned with each other. Consequently, the through-hole 22 of the lid member 10 can be detected through the opening 5.

If the lid member 10 is thus opened from the disc inlet/outlet port 14 to a state in which the disc can be extracted, the detect pin 23 of the lower casing 11b is removed, and as a result, it is possible to detect that the lid member 10 has once been opened, i.e., that the optical disc 12 has once been extracted from the cartridge body 11.

Note that the detect pin 23 may be provided on the upper casing 11a.

Figure 13:
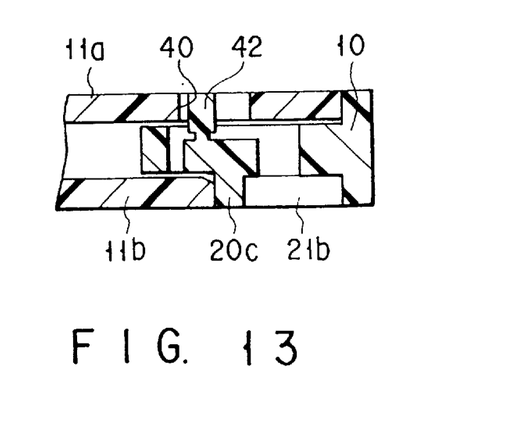
FIG. 13 is a cross-section showing a modification of the opening detect portion.

As shown in FIG. 13, the opening detect mechanism may have another construction wherein a through-hole 40 for detecting whether the lid member 10 is opened or closed is formed in the upper casing 11a and a detect pin 42, which is engaged with the through-hole 40 and can be easily bent and removed, is provided on the lid member 10, e.g., on the write protect operating portion 20, so that the detect pin 42 is bent and detached when the lid member 10 is rotated and opened from the disc inlet/outlet port 14 of the cartridge body 11. In this manner, whether the through-hole 40 formed in the upper casing 11a is closed or opened is detected and whether or not the lid member 10 has once been opened is identified. In this case, the through-hole 40 used for detection may be formed in the lower casing 11b.

In this case, the through-hole 40 is formed to be elongated in the moving direction of the write protect operating portion 20 so that the write protect operating portion 20 can be switched and operated in the state where the lid member 10 is closed. In addition, the through-hole 40 and the detect pin 42 extend in a direction perpendicular to the moving direction of the lid member 10.

Figure 14A:
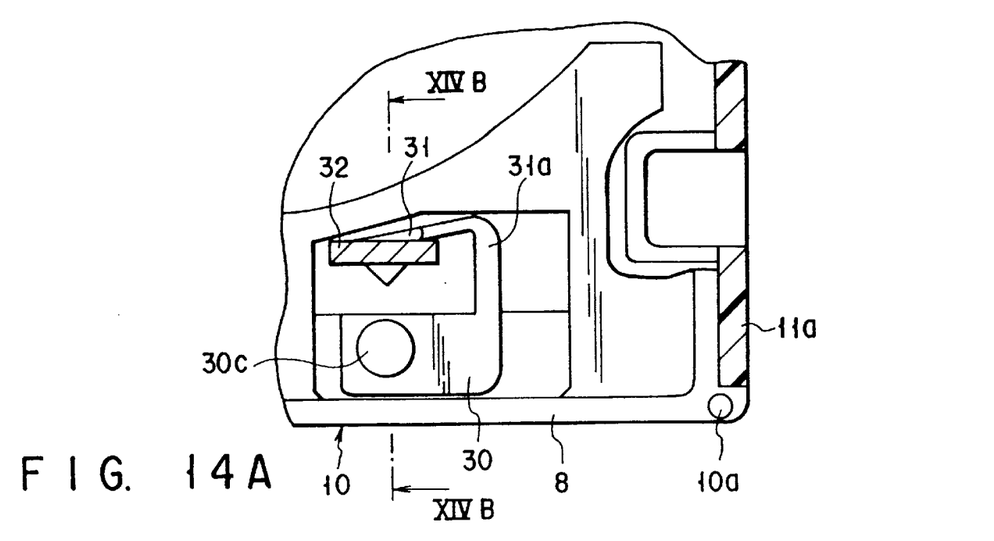
FIG. 14A is a plan view showing another modification of the opening detect portion.
Figure 14B:
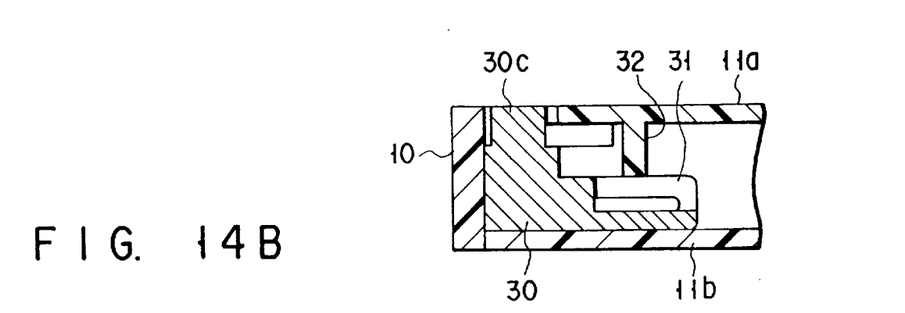
FIG. 14B is a cross-section showing the opening detect portion according to the another modification.
Figure 15:
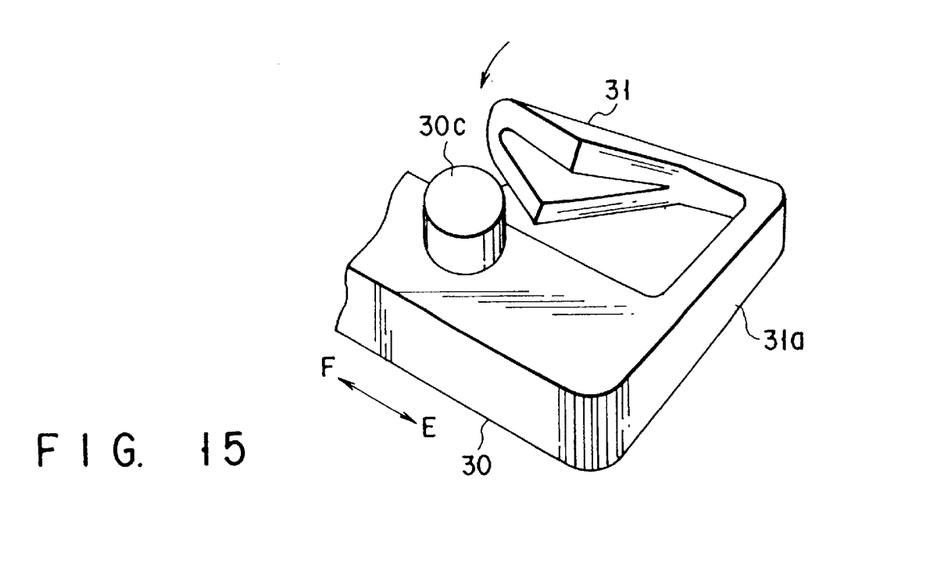
FIG. 15 is a perspective view showing the write-protect operating portion of the opening detect portion according to the another modification.

In addition, the opening detect mechanisms may be constructed as shown in FIGS. 14A, 14B, and 15. Specifically, the lid member 10 is provided with a write protect operating portion 30, which is movable in an arrow direction E-F. This write protect operating portion 30 is provided with a bent portion 31 through an elastic arm 31a, and the bent portion 31 is bent in a V-shaped and can be elastically deformed through the elastic arm 31a. An operating element 30c is formed on the write protect operating portion 30. In addition, a position limit projection 32 that abuts the bent portion 31 is projected on the inner surface of the upper casing 11a. Further, when the lid member 10 is provided between the upper and lower casings 11a and 11b, the bent portion 31 is brought into contact with the position limit projection 32 and is installed in bent position by being detained by limit projection 32 against the elasticity of the bent portion 31 itself.

In the structure described above, when the lid member 10 is rotated in the arrow direction D with respect to the cartridge body 11, as has been described above, this lid member opens the disc inlet/outlet port 14 of the cartridge body 11, and simultaneously the bent portion 31 leaves the position limit projection 32.

When the lid member 10 once opened is rotated in the arrow direction C, thereby closing the disc inlet/outlet port 14 of the cartridge body 11, the corner portion side of the write protect operating portion 30 is brought into contact with the position limit portion 32, and is rotated in the counterclockwise direction by the position limit projection 32, in accordance with rotation of the lid member. As a result, the write protect operating portion 30 is moved in the arrow direction E, and locked at the write protect position. Further, whether or not the lid member 10 is opened from the disc inlet/outlet portion 14 is identified on the basis of the position of the write protect operating portion 30.

Figure 16:
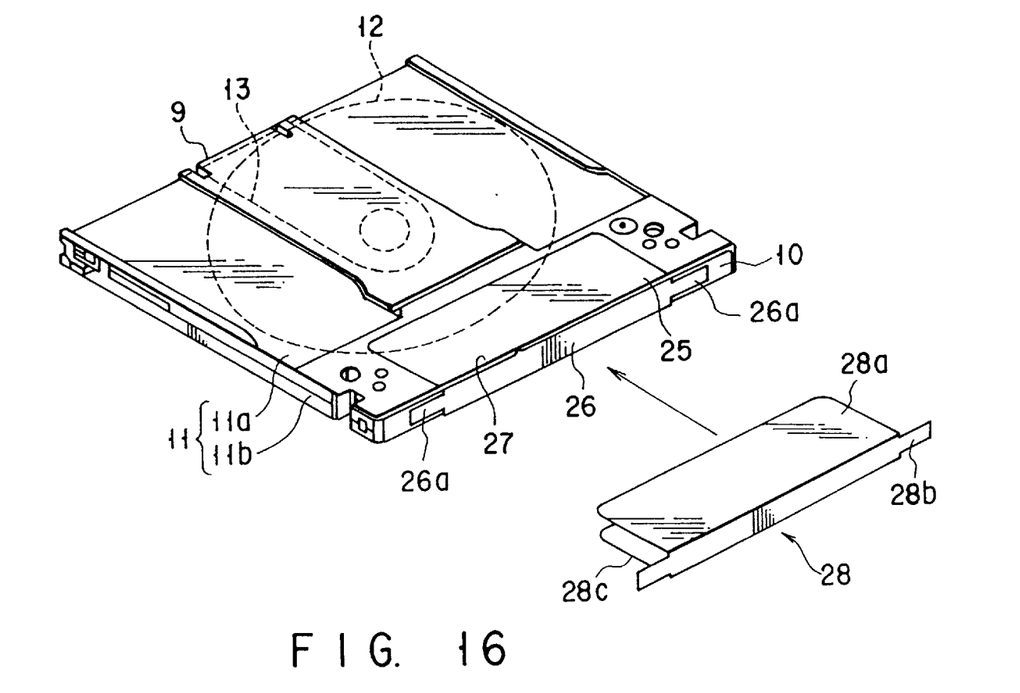
FIG. 16 is a perspective view showing the disc cartridge and an indication label applied thereto.
Figure 17:
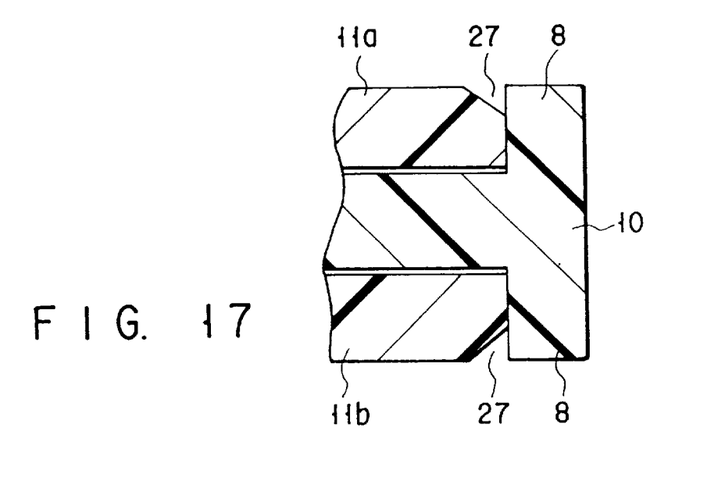
FIG. 17 is a cross-section showing a label separation groove of the cartridge body.

In the rear end portion of the cartridge body 11, as shown in FIGS. 1, 16, and 17, first label adhering portions 25, each having a rectangular concave shape and each recessed from the other portions, are respectively formed in the main surfaces of the upper and lower casings 11a and 11b which are opposite to the optical disc. (For conveniences, FIG. 1 shows only one of the first label adhering portions 25 which is provided in the upper casing.) In addition, a second label adhering portion 26 having an elongated rectangular shape is formed on the outer surface of the lid member 10 and is continuous to the first label adhering portions 25.

Concave position limit portions 26a projecting to both sides of the cartridge body 11 are respectively provided at both ends of the second label adhering portion 26. Further, label separation grooves 27 are formed on the rear end edges of the upper and lower casings 11a and 11b and extend along the boundaries between the first label adhering portions 25 and the second label adhering portion 26.

An indication label 28 having first to third rectangular indication surfaces 28a, 28b, and 28c is adhered on the first and second label adhering portions 25 and 26 of the cartridge body 11, as shown in FIG. 16. Among these indication surfaces, the second indication surface 28b is shaped so as to have a longer length dimension than the first and third indication surfaces 28a and 28c, and is positioned with respect to the second label adhering portion 26 in such a manner that three edges of each side projecting portion of the indication surface 28b are matched with the corresponding position limit portion 26a of the second label adhering portion 26. At the same time, the first and third indication surfaces 28a and 28c of the indication label 28 are adhered onto the first label adhering portions 25 such that the end portions of these surfaces respectively correspond to the end portions of the first label adhering portions 25 of the upper and lower casings 11a and 11b.

The position limit portions 26a of the second label adhering portion 26 are formed such that the position limit portions 26a define at least two end edges of the indication surface 28b of the indication label 28.

Further, the indication label 28 thus adhered on the first and second label adhering portions 25 and 26 can be easily divided into first to third indication surfaces 28a to 28c, by tracing the label separate grooves 27 of the cartridge body 11 with use of a tool, such as a pen or the like. Therefore, the indication label 28 adhered on the first and second label adhering portions 25 and 26 can easily be replaced partially, in units of first to third indication surfaces 28a to 28c. As a result of this, when information in the optical disc 12 is over-written for example, the label can be easily replaced in such a manner the replacement of a current indication label does not affect records on other portions of the current indication label.

Hence, the indication label 28 is adhered on a base sheet 33 with an adhesion applied on the back surface of the label, such that the label, can be pealed off from the sheet, as shown in FIGS. 18A to 18D. In case of the indication label 28 shown in FIG. 18A, boundaries between first to third indication surfaces 28a to 28c are not processed. However, perforation-like cutting guide lines (FIG. 18B) may be formed at a predetermined distance maintained therebetween, or cutting guide lines (FIG. 18C) continuously extending in the widthwise direction to the middle area of the boundaries may be formed on the boundaries, so that first to third indication surfaces can be separated from each other upon requests after the indication label 28 is adhered on the cartridge body 11. In this manner, handling ability of the label can be improved when adhering labels.

Figure 18A:
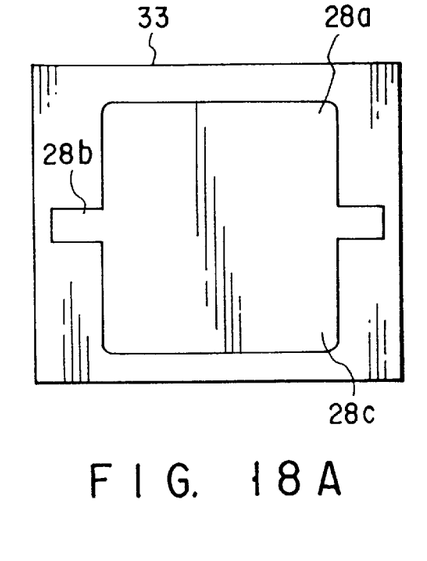
FIGS. 18A to 18D are plan views respectively showing different indication labels.
Figure 18B:
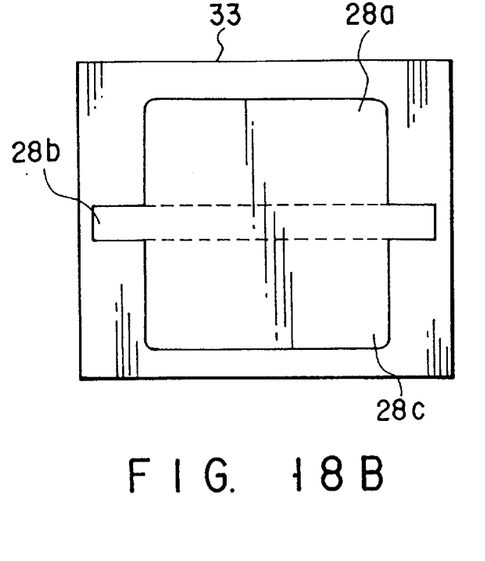
Figure 18C:
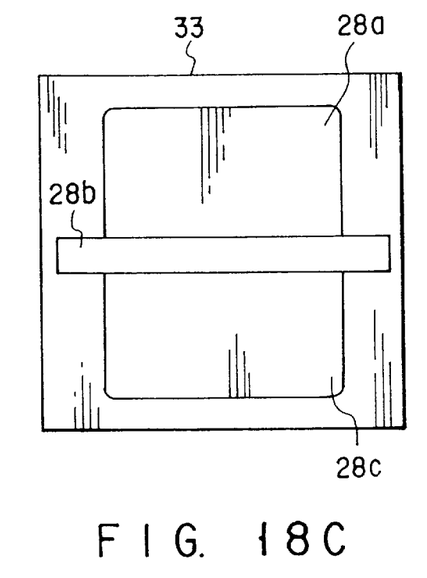
Figure 18D:
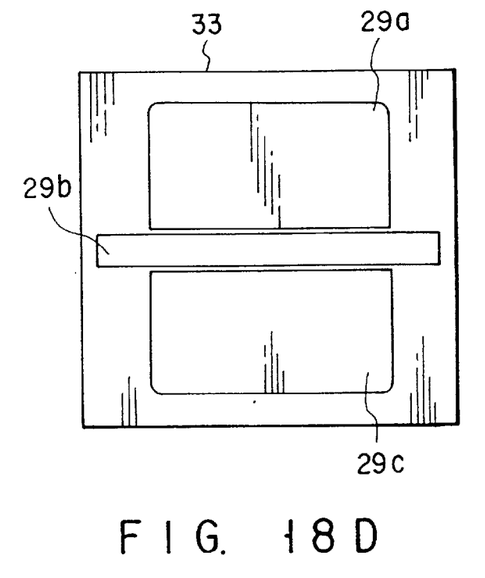
Figure 19:
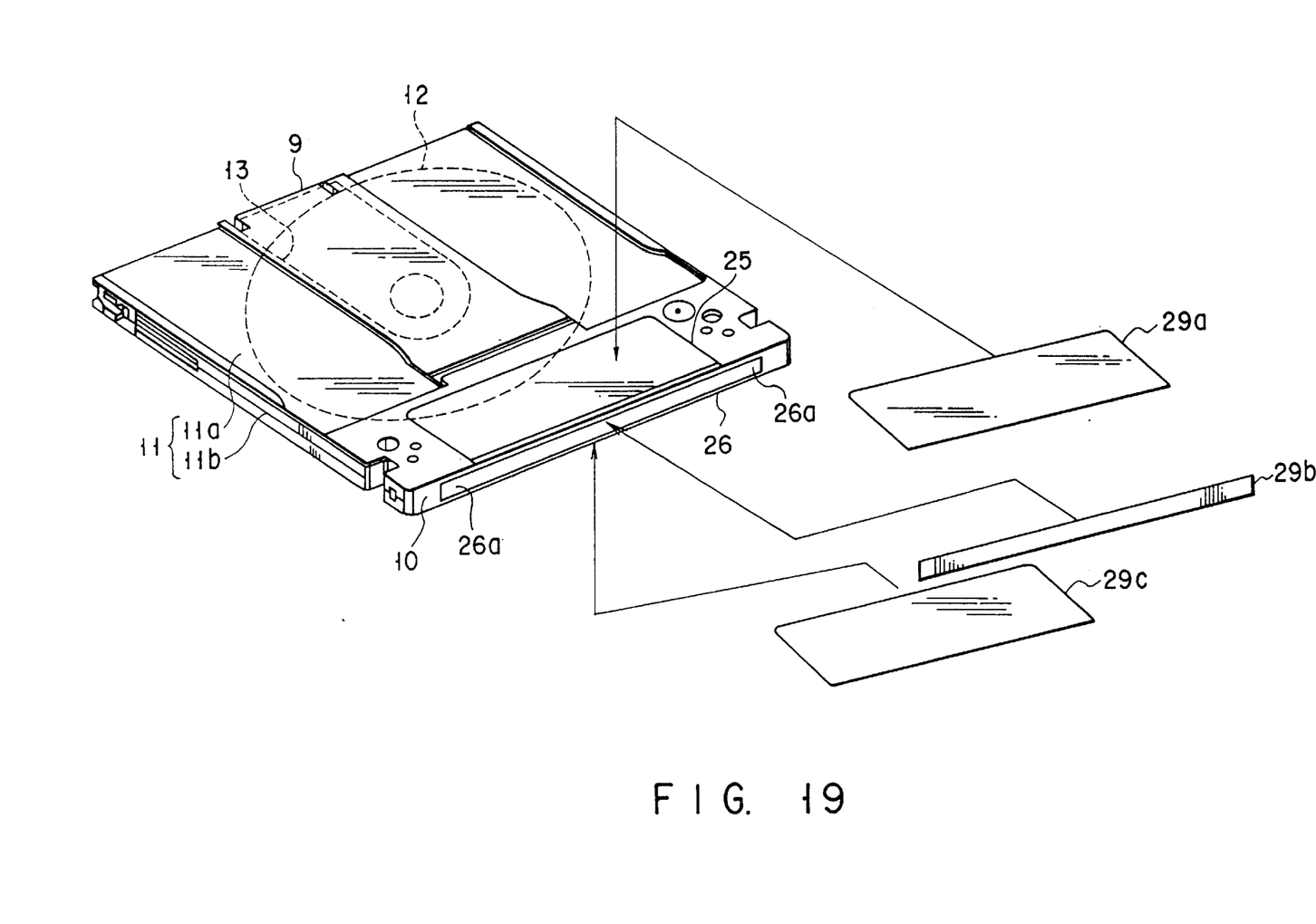
FIG. 19 is a perspective view showing the disc cartridge and another indication label applied thereto.

Otherwise, as shown in FIG. 19, indication labels 29a to 29c each having one single indication surface may be independently adhered on the first and second label adhering portions 25 and 26 of the cartridge. Then, the adhering area of the second label adhering portion 26 of the lid member 10 in the rear side of the cartridge body 11 can particularly be enlarged, so that the indication contents can achieve a high degree of freedom. In this case, the indication labels 29a to 29c are independently adhered on the base sheet, as shown in FIG. 18D.

When the disc cartridge constructed as described above is loaded into a disc recording/reproducing device not shown along the insert direction E shown in FIG. 1, the shutter 9 is slid toward an end side (to the left or right) at first by the shutter opening/closing means in the device, and the opening portion 13 is thereby opened. Then, a turn table not shown enters through the opening portion 13 into the cartridge body 11 to rotatably support the optical disc 12 while a pick-up faces one surface of the optical disc 12 through the opening portion 13.

In this state, the optical disc 12 is rotated by the turn-table, and information signals are recorded on and/or reproduced from the optical disc 12 by the pick-up. To record information into the optical disc 12, the first or second write protect operating portion 19 or 20 must be previously set to the write allowable position.

To extract the optical disc 12 from the cartridge body 11, the lock claw 16 of the lid member 10 is pushed against the elasticity of itself, so as to leave the engage hole 17, and the lid member is rotated in the arrow direction D. Then, the disc 12 stored in the disc storing portion 15 of the cartridge body 11 is guided along the disc guide groove portion 18 of the lid member 10, passing through the disc inlet/outlet port 14, so that extraction of the disc is enabled. In this state, the lid member 10 bends and detaches the open/close detect pin 23 provided in the lower casing 11b of the cartridge body 11, in association with its rotation, thereby indicating that the lid member 10 has been opened so that the disc can be extracted.

Lid member 10 closes the disc inlet/outlet port 14 when the lid member 10 is rotated in the arrow direction C from its open position. In this case, if the free end portion of the lid member 10 is pushed until it eliminates the clearance M and abuts against the rear end surface 11d of the cartridge body 11, the lock claw 16 is elastically engaged with the engage hole 17, and the lid member 10 securely closes the disc inlet/outlet port 14, while being kept in contact with the rear end surface of the cartridge body 11 by the elastic force of the lid member itself.

According to the disc cartridge constructed in the structure as described above, the lid member 10 is provided in the disc inlet/outlet port 14 of the cartridge body 11 such that the lid member 10 can be freely opened/closed, and an opening detect pin 23 is provided in the lower casing 11b of the cartridge body 11. The lid member 10 is assembled and positioned so as to close the disc inlet/outlet port 14 with the opening detect pin 23 being inserted in the through-hole 22 formed in the lid member 10. The detect pin 23 is arranged such that this pin is pressed and cut out by the circumferential wall defining the through-hole 22 when the lid member 10 is opened from the disc inlet/outlet port 14.

According to this structure, the cartridge body 11 storing the optical disc 12 realizes the use of the optical disc in a form of a disc cartridge structure, when this cartridge body 11 is loaded into a disc recording/reproducing device.

When the lid member 10 is opened from the disc inlet/outlet port 14 of the cartridge body 11, the detect pin 23 is removed from the lower casing 11b, so that the optical disc 12 can be extracted through the disc inlet/outlet port 14. Therefore, the optical disc 12 can be used singly without being removed from the cartridge body 11. In this case, the fact that the optical disc 12 has been singly used is confirmed by the detect pin 23, which is removed from the lower case 11b of the cartridge body 11, and the use condition of the disc can thus be identified.

Note that the present invention is not limited to the above embodiment, but can be variously modified within the scope of the present invention. For example, the above explanation has been made to an embodiment applied to the optical disc 12 having data recording surfaces on both sides. However, the present invention is not limited thereto but can be applied to such a disc 12 which has a data recording surface on only one side.

Also, in the above embodiment, explanation has been made to a case where the invention is applied to a lid open/close structure in which a lid member 10 is mounted on the cartridge body 11 to be freely rotatable with respect to the disc inlet/outlet port 14. However, the present invention is not limited hereto, but other various structures are applicable as the lid open/close structure. The recording medium is not limited to the optical disc, but any other kind of disc-like recording medium such as a the magnetic disc, a magneto-optical disc, or the like is applicable.

Further, the disc inlet/outlet port 14, which is opened and closed by the lid member, is provided at that end portion of the cartridge body 11 which is opposite to the opening portions 13 of the cartridge body 11. However, the disc inlet/outlet port 14 may be provided at another end face of the cartridge body except for the end face where the opening portions 13 is provided.

What is claimed is:

1. A disc cartridge comprising:
   a cartridge body for storing a disc-like recording medium, the recording medium contained rotatably in the cartridge body, the cartridge body including an opening portion for exposing a part of a surface of the recording medium, and a disc inlet/outlet port for taking out and putting in the recording medium;
   a shutter slidably mounted on the cartridge body, for opening/closing the opening portion;
   a lid member mounted on the cartridge body to be movable between a closed position wherein the lid member closes the disc inlet/outlet port and an opened position wherein the lid member opens the disc inlet/outlet port; and
   opening detect means for detecting whether the lid member has been moved and the disc inlet/outlet port has ever been opened, wherein the opening detect means includes an engage portion provided on the lid member, and a detecting convex portion provided on the cartridge body and engaged with the engage portion of the lid member in the closed position, the detecting convex portion being removable from the cartridge body so as to indicate that the lid member has been opened, and the lid member being movable when the detecting convex is removed.

2. A disc cartridge comprising:
   a cartridge body for storing a disc-like recording medium, the recording medium contained rotatably in the cartridge body, the cartridge body including an opening portion for exposing a part of a surface of the recording medium, and a disc inlet/outlet port for putting in and taking out the recording medium;
   a shutter slidably mounted on the cartridge body, for opening/closing the opening portion;
   a lid member mounted on the cartridge body to be movable between a closed position wherein the lid member closes the disc inlet/outlet port and an opened position wherein the lid member opens the disc inlet/outlet port; and opening detect means for detecting whether the lid member has been moved and the disc inlet/outlet port has ever been opened, wherein the opening detect means includes an engage portion provided on the cartridge body and a detecting convex portion provided on the lid member and engaged with the engage portion of the cartridge body at the closed position, the detecting convex portion being removable from the lid body so as to indicate that the lid member has been opened, and the lid member being movable when the detecting convex is removed.

3. A disc cartridge comprising:

a cartridge body for storing a disc-like recording medium, the recording medium contained rotatably in the cartridge body, the cartridge body including an opening portion for exposing a part of a surface of the recording medium, and a disc inlet/outlet port for taking out and putting in the recording medium; and a shutter for opening/closing the opening portion;

a lid member mounted on the cartridge body to be movable between a closed position wherein the lid member closes the disc inlet/outlet port and an opened position wherein the lid member opens the disc inlet/outlet port, the cartridge body having a detection mechanism positioned in a detection opening, the detection opening for indicating whether the recording medium has ever been taken out of the cartridge body, wherein the detection opening is closed in an original state in which the lid member is closed by the detection mechanism, and when the status of the detection opening changes from closed to open, the lid member is movable to the opened position and the recording medium can be taken out of the cartridge body, and wherein, once the status of the detection opening changes from closed to open, the open status is kept and can not be changed to the closed status.

\* \* \* \* \*